United States Patent
Atar et al.

(10) Patent No.: US 8,844,322 B2
(45) Date of Patent: Sep. 30, 2014

(54) OPTICAL WAVEGUIDE FABRICATION

(75) Inventors: Gil Atar, Yavne (IL); Ariel Bruner, Yavne (IL); David Eger, Yavne (IL); Bruno Sfez, Yavne (IL)

(73) Assignee: Soreq Nuclear Research Center, Nahal Soreq, Yavne (IL)

( * ) Notice: Subject to any disclaimer, the term of this patent is extended or adjusted under 35 U.S.C. 154(b) by 72 days.

(21) Appl. No.: 13/643,552

(22) PCT Filed: Apr. 26, 2011

(86) PCT No.: PCT/US2011/033862
§ 371 (c)(1),
(2), (4) Date: Jan. 2, 2013

(87) PCT Pub. No.: WO2011/139659
PCT Pub. Date: Nov. 10, 2011

(65) Prior Publication Data
US 2013/0209047 A1    Aug. 15, 2013

(51) Int. Cl.
*C03B 37/022*    (2006.01)
*G02B 6/10*    (2006.01)
*H01S 3/063*    (2006.01)
*G02B 6/13*    (2006.01)
*H01S 3/16*    (2006.01)
*H01S 3/17*    (2006.01)
*G02B 6/136*    (2006.01)

(52) U.S. Cl.
CPC . *G02B 6/13* (2013.01); *H01S 3/063* (2013.01); *H01S 3/1618* (2013.01); *H01S 3/176* (2013.01); *G02B 6/136* (2013.01)
USPC .................. 65/386; 65/388; 65/392; 385/129

(58) Field of Classification Search
None
See application file for complete search history.

(56) References Cited

U.S. PATENT DOCUMENTS

| | | | |
|---|---|---|---|
| 5,196,041 A * | 3/1993 | Tumminelli et al. | 65/386 |
| 5,556,442 A * | 9/1996 | Kanamori et al. | 65/17.4 |
| 5,800,860 A * | 9/1998 | Kilian et al. | 427/163.2 |
| 6,226,433 B1 | 5/2001 | Weber | |

FOREIGN PATENT DOCUMENTS

GB    2066805    7/1981

* cited by examiner

*Primary Examiner* — Hemang Sanghavi
(74) *Attorney, Agent, or Firm* — Dekel Patent Ltd.; David Klein

(57) ABSTRACT

An optical device including an active core layer of silica glass doped with ions which serve as optical emitters, the active core layer being on a silica glass substrate and having a layer thickness of at least 5 μm, and wherein the layer is sintered at a temperature range of 1500-1600 C. and subsequently heat treated by a laser.

10 Claims, 3 Drawing Sheets

OPTICAL WAVEGUIDE FABRICATION

CROSS REFERENCE TO OTHER APPLICATIONS

This application is a U.S. national phase application of PCT patent application PCT/US2011/033862, filed Apr. 26, 2011, which claims priority from U.S. Provisional Patent Application 61/328,137, filed Apr. 27, 2010.

FIELD OF THE INVENTION

The present invention relates generally to a method of fabricating an optical waveguide.

BACKGROUND OF THE INVENTION

High power silica fiber lasers are used for material processing (cutting welding) and numerous other applications. In principle, the fibers are made of a core and clad. The core is doped with rare earth ions for lasing media.

Light is typically transmitted by means of total reflection due to a difference of optical refractive indices between the clad and the core. Both the fiber core and cladding are typically doped elements such as germanium dioxide ($GeO_2$) or aluminium oxide ($Al_2O_3$)) are added to the silica core to slightly increase the optical refractive index. The aluminium also plays a role of making the rare earth ions soluble in the $SiO_2$. Fluorine or boron trioxide ($B_2O_3$) is used to lower the refractive index.

Ge is also used for UV writing of channel waveguides. The core is doped with an amount of 4.1 wt. % Ge and 12.3 wt. % of phosphorous.

In general, the process of fabricating the optical fiber is further divided into a process of fabricating an optical fiber preform and a process of drawing an optical fiber from the optical fiber preform. The process of fabricating an optical fiber preform is accomplished by utilizing such methods as a modified chemical vapor deposition (MCVD) method, or other methods such as a vapor-phase axial deposition (VAD) method and an outside vapor deposition (OVD) method, coupled with solution doping. In the process of MCVD, a porous core layer with appropriate thickness and composition is deposited over the cladding layer followed by soaking with an aqueous/alcoholic solution of suitable composition for a fixed time span. Subsequent to solution doping, the soaked layer is dried and sintered for transformation to clear glass. The tube is finally collapsed to a solid rod known as a preform.

Fiber of standard dimension is drawn from the preform using a fiber drawing tower Planar waveguide lasers have potential advantages over the fiber lasers: standard microelectronics production techniques, heat removal and pumping schemes. Waveguide fabrication does not require fiber drawing, which requires non-standard, costly equipment and brings limitations to the possible designs.

There are a number of techniques to produce silica waveguides such as thermal oxidation of silicon crystals, deposition of $SiO_2$ thin films by sputtering or thermal evaporation, ion exchange in silica substrates and sol-gel preparation.

For high power laser applications the waveguides have to be relatively thick (e.g., 10-100 microns), highly doped with the rear earth ions and of very high optical quality. None of the above mentioned techniques has the ability to produce a waveguide with the required high power properties. Thus high power waveguide lasers have not been realized until now.

SUMMARY OF THE INVENTION

The present invention seeks to provide a novel process for producing a silica waveguide, such as for laser and optical amplifier applications, as is described more in detail hereinbelow.

There is thus provided in accordance with an embodiment of the present invention apparatus including an optical device including an active core layer of silica glass doped with ions which serve as optical emitters, the active core layer being on a silica glass substrate and having a layer thickness of at least 5 μm, and wherein the layer is sintered at a temperature range of 1500-1600° C.

In accordance with an embodiment of the present invention the layer is co-doped with a dopant that modifies a refractive index of the layer to provide optical guiding in the layer. The layer may be additionally co-doped with rare-earth ions.

In accordance with an embodiment of the present invention the core layer transparency is improved by heating with a laser beam on a surface of the layer.

In accordance with an embodiment of the present invention the laser beam has a wavelength that is absorbed by the silica layer.

In accordance with an embodiment of the present invention the layer is partially etched to get lateral confinement of light propagation in the layer.

In accordance with an embodiment of the present invention an additional layer or layer sequence is added to control light guiding.

BRIEF DESCRIPTION OF THE DRAWINGS

The present invention will be understood and appreciated more fully from the following detailed description taken in conjunction with the drawings in which:

FIGS. 2A and 2B are microscope pictures of the surface of the silica glass substrate surface used in the waveguide, the pictures being taken using dark field transmission mode, wherein FIG. 2A shows the surface before laser treatment and shows evidence of both micro-voids and crystallites, and wherein FIG. 2B shows the glass surface at the center area of the raster scan track, this part of the glass having been completely melted and neither micro-voids nor crystallites are evident, in accordance with an embodiment of the present invention;

DETAILED DESCRIPTION OF EMBODIMENTS

Figure 1:
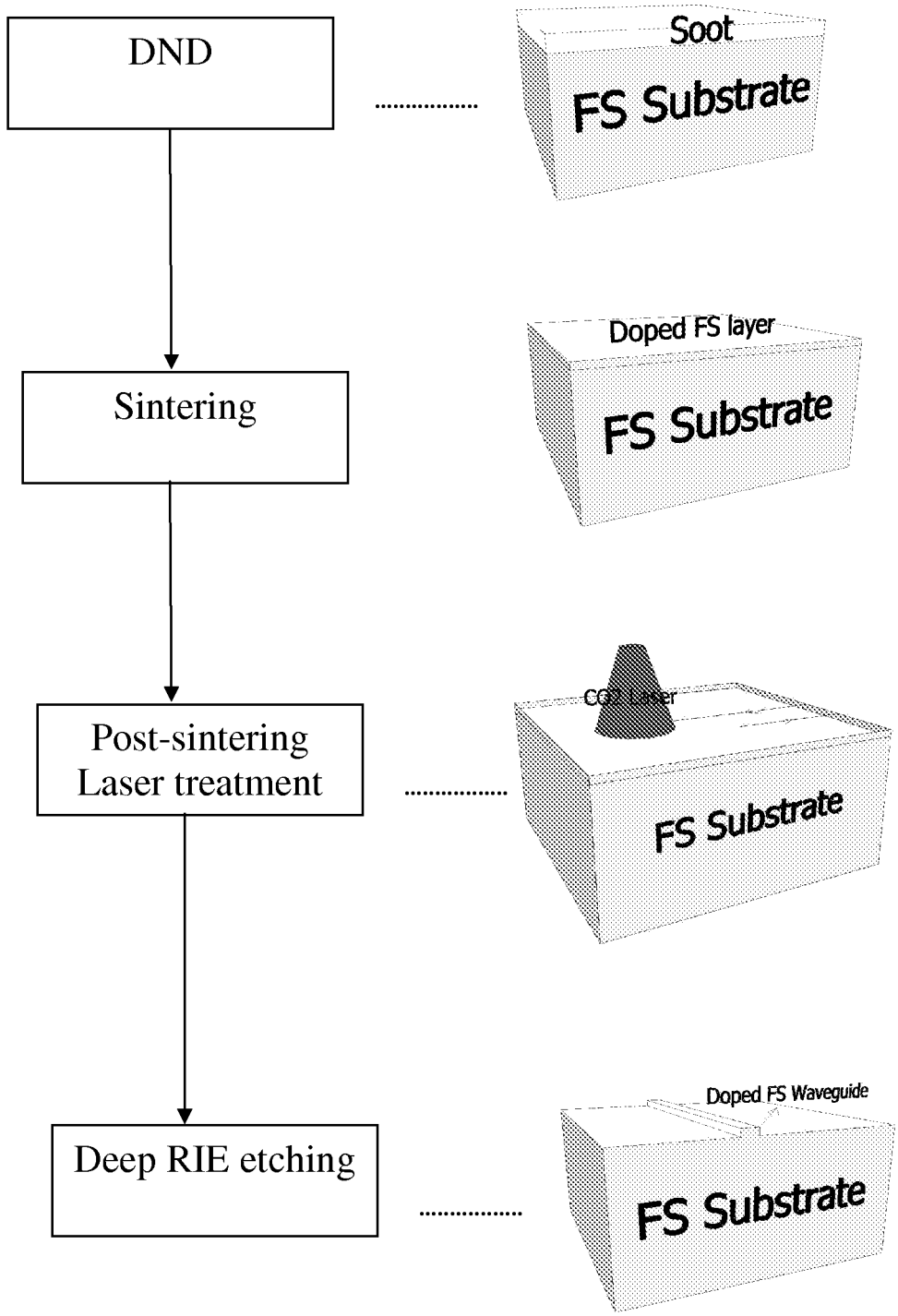
FIG. 1 is a simplified flow chart of a method for producing a silica waveguide, in accordance with an embodiment of the present invention.
Figure 2A:
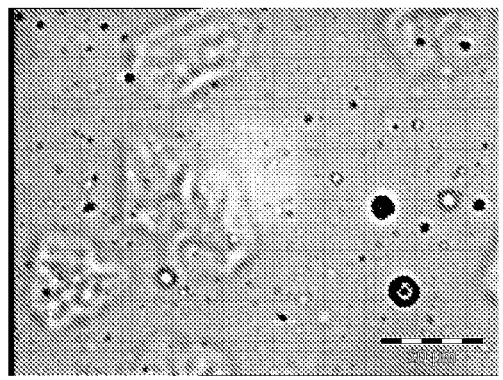
Figure 2B:
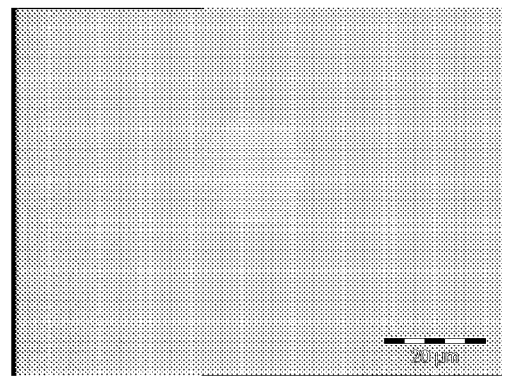
Figure 2C:
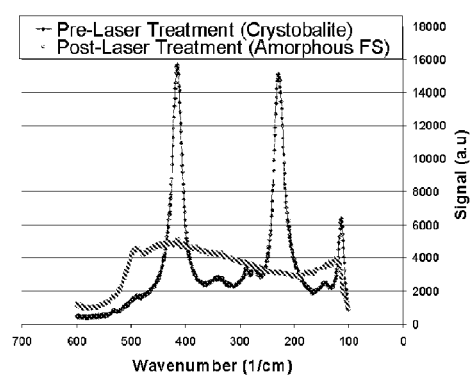
FIG. 2C illustrates a graph of Raman micro-spectroscopy results, wherein the "before" curve contains signal peaks typical of Cristobalite crystalline phase of silica, whereas the "after" curve contains no peaks, in accordance with an embodiment of the present invention, and is typical of amorphous fused silica (this is evidence of amorphization)
Figure 3A:
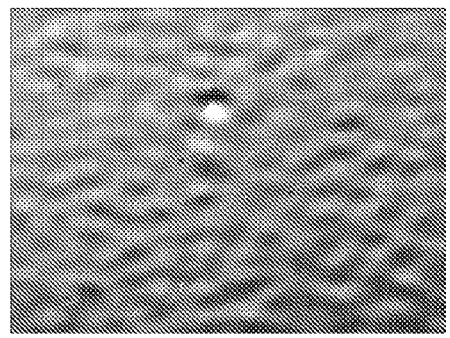
FIGS. 3a and 3B are simplified side-illuminated pictures of the surface of sintered fused silica before and after laser treatment respectively.
Figure 3B:
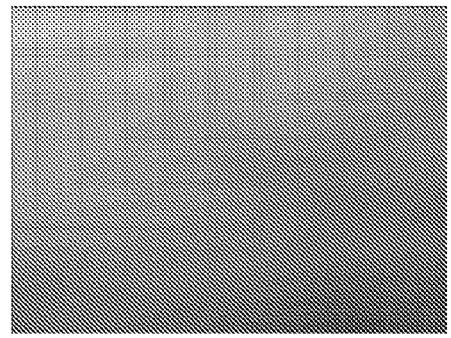
Figure 3C:
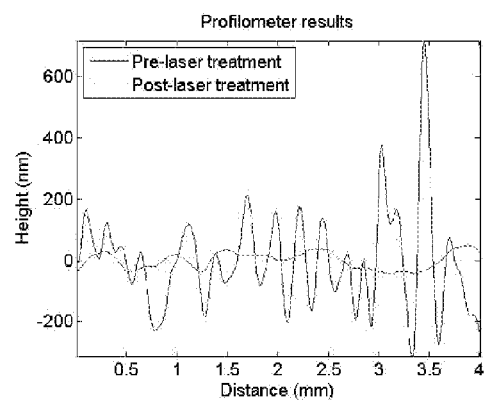
FIG. 3C is a graph of profilometer scans results before and after laser treatment, and surface roughness improvement is evident both in terms of amplitude and spatial period, in accordance with an embodiment of the present invention.

In accordance with a non-limiting embodiment of the present invention, there is provided a method for producing a silica waveguide including the following steps (shown in FIG. 1):
 a. Silica deposition
 b. Sintering
 c. Post Sintering Laser Treatment
 d. Deep Reactive Ion Etching (DRIE)
 a. Deposition Process for Thick Active Waveguides:

Depositing a layer (coating) of doped silica nanoparticles on a fused silica (FS) substrate (e.g., by flame hydrolysis deposition on a silica glass substrate). The process is similar to that used for fibers; however, the thickness of the coating is much lower. Typically the after-sintering layer thickness is between 5 and 50 µm. Layer thickness is defined as the final thickness of the material after all thermal processes. The layer may be co-doped with a dopant that modifies the refractive index of the material to provide optical guiding in the layer, such as aluminium, boron and other dopants well-known in the art of optical fiber fabrication.

In addition, in order to obtain an active core, the layer is also doped with rare-earth ions. Such a deposition process is commercially available from the company Liekki Oy (Finland) or nLight (USA) using their proprietary Direct Nanoparticles Deposition (DND) technology.

The tray material which holds the samples during the deposition process is preferably resistant to high temperature and prevents contamination. For example, the samples are held in quartz.

Soot Deposition Conditions:

The process parameters of temperature, soot density and thickness depend on each other.

1) Morphology—Smooth layer, not grainy. Preferably does not contain soot grains greater than 100 µm. Preferably does not contain any type of particles contamination of foreign materials such as metal 2) Temperature—this is a critical parameter of the deposition, since it determines soot density and the thickness of the layer after sintering. The density increases with the temperature. Layer morphology improves with temperature as well, however for sufficiently high temperatures bubbles start to appear as well as crystallites at the interface. In this case, a premature sintering is started during deposition, closing some of the pores and entrapping bubbles.

3) Density: High flame temperature will cause denser soot and crystalline interface. The soot might be even "pre-sintered". The target flame temperature is preferably lower than 1100° C.

In general, the closer the flame is to the surface the higher the temperature is at the surface, so the soot becomes denser. The density ranges roughly between 0.2-0.7 grams/cm³ (fused silica is 2.2 g/cm³). The burner height has to be chosen so that it is not too close to the trays. The scanning length has to allow part of the tray to cool down before the flame hits it again.

The burner height and process duration has to be set in the calibration process in order to obtain the absolute density as defined by:

$$\rho_a = \rho_{SiO2} \times (d_{soot}/d_{glass}) = 2.2_{gr/cm3}/8.3 = 0.26$$

$d_{soot}$—soot thickness after deposition
$d_{glass}$—layer thickness after sintering
$d_{soot}/d_{glass}$=8.3—contraction factor 4) Soot thickness—The thickness of the layer obtained after sintering depends on time and also on its density, hence on the deposition temperature. Wafer bowing can occur during the sintering stage. The distortion of the substrate during sintering is related to the absolute thickness of the layer. It becomes more severe as the thickness is increased, regardless of the soot initial density. In other words, the distortion is not lower for layers prepared from denser soot but is lower for thinner layers. The thickness is preferably uniform. Thickness variations on the sample are preferably less than 15%. The layer thickness is controlled by controlling the process time.

b. Sintering

Sintering the coated substrate can be performed by introducing the substrate into an oven to sinter the coated layer at 1450-1700° C. for 5-45 minutes. This temperature is high enough to accomplish the sintering, yet low enough to prevent substrate deformation. The process should last long enough to allow significant densification yet short enough to avoid severe crystallization. Optionally and atmospheric gas can be used during the process The atmospheric gas is trapped in the voids which are formed in the porous layer in the process of densification. To allow rapid diffusion of the gas from the porous layer outward, He gas can be used as atmospheric gas. The choice of a different inert gas such as Ar would result in slow diffusion and significant residual voids in the sintered layer.

Sintering Apparatus:

The process of sintering involves rapid heating and cooling of the silica layer. In order to do so careful choice of materials for the sintering system should be made to assure durability in the wide range of temperatures 25-1700° C. and might involve thermal shock. An example is given below of a complete sintering apparatus to meet the sintering condition described above.

Furnace: A furnace based on electric resistant heating elements is slowly preheated (50-150° per hour) to the sintering temperature. The chamber is made of a horizontal $Al_2O_3$ tube (type ALSINT) which stands the necessary temperature range and temperature gradient along the furnace. The use of a different material such a quartz tube is not possible as it softens at high temperatures and bends over time. The furnace is pre-heated to the desired sintering temperature.

Sample mobilization: In order to avoid crystallization, the coated substrate is rapidly inserted from room temperature into the center of the furnace (area of the sintering temperature) and rapidly taken out of the furnace to room temperature as soon as the sintering process is completed. The process of insertion/extraction of the sample from room temperature zone to sintering temperature zone is made in a period of less than 10 seconds. This can be done using a quartz rod mounted on a rail which allows the pushing of the coated sample in and out of the high temperature area of the furnace. Quartz is resistant to thermal shock and as the process of moving the sample is short, softening and consequent bending of the quartz rod are avoided. The use of a different material such as $Al_2O_3$, which is durable for the range of temperatures, would result in material failure due to thermal shock.

Sample carrier: In order to avoid adhesion of the silica substrate to the chamber a carrier must be used. The carrier material should not adhere either to the $Al_2O_3$ chamber or to the silica substrate at the sintering temperature. The material should stand the range of temperature 25-1700° C. and resist the thermal shock involved in the process of rapid insertion/ extraction of the sample. Such a carrier can be made from SiC (type HALSIC). The use of another material such as quartz would result in undesired adhesion. Sapphire is known to stand the temperature range but fails to resist the thermal shock.

Finally, the process of sintering forms a continuous layer that may still contain some defects in the form of residual voids, crystallites and surface irregularities. These have a negative effect on material's transparency.

c. Post Sintering Laser Treatment

In accordance with an embodiment of the present invention, the optical transmission of the layer (it could also apply to the clad in case of a second deposition) can be improved by heating with a laser beam on the layer surface. That means that by properly choosing the laser heating conditions, it is possible to eliminate the crystallites and voids and reduce surface roughness to obtain a material with much higher transparency. In order to do so the laser must have a wavelength that is absorbed by the silica layer (wavelength above 3 micrometers). It can be a $CO_2$ laser, a laser whose wavelength is obtained by down-conversion from the visible, or a gas laser such as HeNe or CO lasers. These lasers are given as examples and do not intend to be an exhaustive list.

The laser beam is strongly absorbed by the silica, and high temperature is obtained at the spot center. In order to induce amorphization of crystallites of type Cristobalite, the temperature must be higher than 1713° C. However, in order to avoid rapid material loss via evaporation and/or melt ejection, the temperature is preferably kept below 2700° C. Furthermore, in concurrence with amorphization, at this range of temperatures the voids are removed from the layer and surface-tension-induced, viscous flow reduces any existing surface roughness. The outcome is complete elimination of both voids and crystallites and significant reduction of surface roughness as seen in FIGS. 2A-4. As a result, the optical transmittance is typically improved. Optical loss is reduced by a few orders of magnitude from over 80% per cm to less than 5% per cm. The process of local melting using a laser beam may be applied to any size of wafers either by matching the spot size to the wafer size or by following a raster scan pattern. The process can be held in a range of scanning speeds from 0.1 mm/sec to 50 mm/sec and a range of spot sizes from 50 μm to 10 cm simply by applying a suitable laser power to obtain the required range of temperatures in the layer as described above. Several examples of $CO_2$ laser treatment protocols are given below.

1. Near-steady-state scanning regime: This work mode typically involves a relatively low power density and slow scanning. For example, a laser spot of 12 cm diameter (spot radius defined according to the $1/e^2$ convention) and 100 watts output at a scanning speed of 1 mm/sec. The large spot size enables efficient penetration of heat via conduction and so achieving the desired temperature throughout a thick layer. A high density raster scan may be applied to obtain good uniformity over any size of wafer.

2. Non-steady-state scanning regime: This work mode typically involves a relatively high power density and fast scanning, for example, a laser spot of 3 cm at $1/e^2$ and 25 watts output at a scanning speed of 1 cm/sec. In this case, it is necessary to repeat the process a few dozen times to accumulate enough melt time to completely remove all types of defects from the silica layer.

Figure 4:
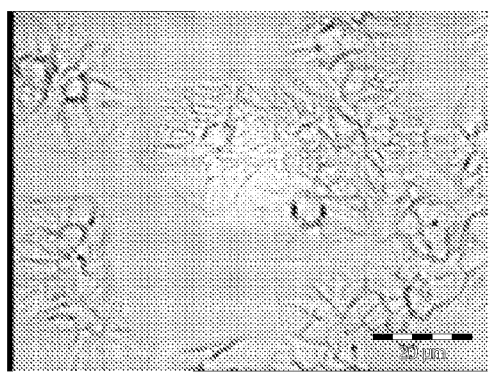
FIG. 4 is a picture of post-laser treatment at the outlines of the raster scan track, wherein in this area only, the perimeter of the laser spot interacts with the glass, inducing local temperatures below melt point; the micro-voids are nearly eliminated yet the crystallites remain extant.

3. Two-step process: This work mode involves initial heating to a temperature range of 1550-1713° C. aimed to remove only the voids as seen in FIG. 4. This can be done using a laser beam by choosing suitable parameters as described above or by using another heating method such as a furnace. Following the complete removal of voids, a laser treatment is applied to quickly raise the temperature of the layer to the required range of 1713-2700° C. to eliminate crystallites and reduce surface roughness using any one of the work modes described above. In this case the need for a high density raster scan or repeated scanning is reduced as a result of the initial void removal.

One of the possible outcomes of a high-density raster scanning is inducing a process of crystallites re-growth at the margins of the laser beam where the induced temperature is kept in the range 1300-1713° C. for a long time. In this case, an initial pre-treatment for eliminating only the crystallites can be applied using a low-density raster scan. This significantly reduces the chance and rate of crystallites re-growth while scanning the laser. In addition, a similar treatment may be applied in-between the high-density raster scan sequence and after it to further eliminate any re-grown crystallites.

d. Deep Reactive Ion Etching (DRIE)

Patterning and etching the obtained layer using standard photolithography and deep reactive ion etching techniques as known in the art in order to obtain a rectangular section structure or group of such structures. This defines the core of the optical waveguides.

The method produces an active core of silica glass doped with ions which serve as optical emitters.

The confinement is achieved by imposing an optical index step between the active core and surrounding medium. Controlling the waveguide mode size and structure size that is required for some applications may be achieved by coating with an additional layer of controlled index of refraction.

In the preferred embodiment the process is completed by the addition of an additional layer of fused silica glass forming the waveguide cladding.

a. Depositing an additional layer of silica nanoparticles so that the refractive index of the additional layer after sintering is lower than the core refractive index.

b. Sintering the additional layer by successive furnace sintering and optional laser treatment In another embodiment, an organic material is deposited (through spin-coating or dipping) on the etched pattern. This organic material can be an organic adhesive with lower refractive index such as Master Bond MS151 optical adhesive or a sol-gel material.

The technique is now further explained by means of examples.

Examples of Waveguide Fabrication:

| | | Soot Deposition | | | |
|---|---|---|---|---|---|
| Example # | Substrate Dimensions (mm) | Soot Thickness [μm] | Absolute density [gr/cm$^3$] | $Yb_2O_3$ [mol-%] | $Al_2O_3$ [mol-%] |
| 1 | 12 × 12 × 6.35 | 100 ± 5% | 0.26 ± 15% | 0.124 ± 20% | 0.955 ± 20% |
| 2 | 45 × 15 × 6.35 | 100 ± 5% | 0.26 ± 15% | 0.124 ± 20% | 0.955 ± 20% |

| | Sintering | | | Laser treatment | | | |
|---|---|---|---|---|---|---|---|
| | | | | | | Scanning | |
| Example # | Time (min) | Temperature (°C.) | Sintered Layer (mm) | Spot diameter 1/e^2 (mm) | Power (watt) | Speed (mm/sec) | cycles/Interlay (units/mm) |
| 1 | 20 | 1550 | 12 × 12 × 0.025 | 3.6 | 39 | 1 | 50/0 |
| 2 | 15 | 1600 | 45 × 15 × 0.025 | 12 | 105 | 1 | 0/0.03 |

Measurements:

Opposite facets were polished and light was coupled guided through the layer.

Results:

Total optical loss (coupling and propagation loss) @633 nm was measured to be 5% and 30% in the case for examples #1 and #2 featuring 1 cm and 4.5 cm optical path respectively.

Yb absorption @970 nm was measured to be 500 dB/m for both examples.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. A method for producing a silica waveguide comprising:
    a. depositing a silica deposition comprising a layer of doped silica nanoparticles on a fused silica (FS) substrate;
    b. sintering said silica deposition, said layer of doped silica after sintering having a thickness between 5 and 50 μm;
    c. performing a post sintering laser treatment, comprising heating said silica layer with a laser beam and choosing laser heating conditions to eliminate crystallites and voids and reduce surface roughness of said surface, said laser beam having a wavelength above 3 μm that is absorbed by said silica layer; and
    d. deep reactive ion etching (DRIE), to obtain a rectangular section structure or group of such structures to define an active core of an optical waveguide, and doping said layer with rare-earth ions which serve as optical emitters.

2. The method according to claim 1, wherein depositing said silica layer is done such that said silica layer does not contain soot grains greater than 100 μm.

3. The method according to claim 1, wherein heating said silica layer with said laser beam comprises heating to a temperature higher than 1713° C. and lower than 2700° C.

4. The method according to claim 1, further comprising imposing an optical index step between said active core and surrounding medium.

5. The method according to claim 1, further comprising controlling waveguide mode size and structure size by coating said silica layer with an additional layer of controlled index of refraction.

6. The method according to claim 1, further comprising adding an additional layer of fused silica glass to form a waveguide cladding.

7. The method according to claim 5, wherein coating with the additional layer comprises depositing an additional layer of silica nanoparticles so that the refractive index of the additional layer after sintering is lower than the core refractive index.

8. The method according to claim 1, further comprising depositing an organic material on the etched silica layer.

9. The method according to claim 1, wherein said sintering is performed at 1450-1700° C. for 5-45 minutes.

10. A silica waveguide produced by claim 1.

* * * * *